UNITED STATES PATENT OFFICE.

JEROME W. FRANK, OF NEW YORK, ASSIGNOR OF THREE-FIFTHS TO LOUIS S. LANGVILLE, OF TROY, NEW YORK.

ADHESIVE.

SPECIFICATION forming part of Letters Patent No. 478,229, dated July 5, 1892.

Application filed September 1, 1891. Serial No. 404,479. (No specimens.)

*To all whom it may concern:*

Be it known that I, JEROME W. FRANK, of New York, county and State of New York, have invented a certain new and useful Improvement in a Liquid Adhesive Composition and the Process of Making the Same, of which the following is a specification.

This invention relates to liquid glue, size, cement, or paste.

In carrying out my invention I employ the waste liquor of bisulphite fiber or wood pulp driven off during the process of manufacturing paper-stock by the bisulphite-of-lime process, which is evaporated until it has the consistency of sirup, and to which is added an alkali, caustic alkali, alkaline earth, equivalent chemical salts of these, or hydrate of ammonia.

I prefer to employ the hydrate of ammonia, and I find a desirable formula to be: To one hundred gallons of liquor of bisulphite fiber or wood pulp evaporated to a bulk of thirty-five gallons add sixty pounds of hydrate of ammonia. The mixture is then heated until an excess of ammonia is driven off and reaction is neutral.

The addition of an alkali, as described, increases the binding or adhesive properties of the composition.

What I claim, and desire to secure by Letters Patent, is—

1. The process of forming an adhesive composition, consisting in adding hydrate of ammonia to the liquor of bisulphite fiber or wood pulp and heating the same until an excess of ammonia is driven off, substantially as specified.

2. An adhesive composition consisting of the liquor of bisulphite fiber or wood pulp and an alkali, substantially as specified.

3. An adhesive composition consisting of the liquor of bisulphite fiber or wood pulp and hydrate of ammonia, substantially as specified.

In testimony whereof I have signed my name to this specification in the presence of two subscribing witnesses.

JEROME W. FRANK.

Witnesses:
B. FRANKFELD,
JAS. ULMANN.